Patented Oct. 30, 1945

2,388,143

UNITED STATES PATENT OFFICE 2,388,143

HARDENABLE AMINOTRIAZINE-ALDEHYDE RESINS

Raymond R. Harris, Stamford, Conn., assignor to American Cyanamid Company, New York, N. Y., a corporation of Maine No Drawing. Application October 5, 1943, Serial No. 505,031

4 Claims. (Cl. 260—72)

This invention relates to substantially stable compositions containing an aminotriazine-aldehyde resin and a curing catalyst.

Many difficulties are encountered in the storage of dry aminoplastic resins such as the aminotriazine-aldehyde resins. These resins are packaged in the dry form alone or in admixture with others for use as molding compositions, adhesives, in the preparation of coating compositions, impregnating compositions, laminating compositions, etc. Generally, it is desirable to incorporate a curing catalyst in the dry resin but during storage, because of the potentially acidic nature of such catalysts as those which have heretofore been used, the resin has become partially polymerized. Another difficulty is that many substances which set free acid upon the addition of water to the dry resin containing the catalyst are so active that the resulting solutions gel or become too viscous to use as a glue or for coating or impregnating purposes in an extremely short time. Other substances which have been used do not produce sufficient acidity to cause the resin to cure thoroughly at low temperatures and in some cases such catalysts do not cause the resin to cure even after a considerable time at elevated temperatures. These substances are, of course, unsuitable for use in cold-set adhesives.

Up to the time of my invention cold-setting adhesives composed of melamine-formaldehyde resins did not produce bonds having satisfactory shear strength.

An object of the present invention is to provide curing catalysts for aminotriazine-aldehyde resins which will cause the latter to cure rapidly and particularly in aqueous solutions.

Another object of this invention is to provide aminotriazine-aldehyde resin compositions, including a curing catalyst, which compositions are substantially stable upon storage at ordinary temperatures for a considerable period of time, e. g., six months—one year.

Still another object of my invention is to provide a melamine-formaldehyde resin adhesive, including a curing catalyst, which adhesive has a sufficient working life to be used commercially.

A further object of my invention is to provide a melamine-formaldehyde resin adhesive, including a curing catalyst, which adhesive exhibits high shear strength when applied to wooden surfaces and which is resistant to water.

These and other objects are attained by incorporating a small proportion of an ammonium salt of a complex inorganic acid containing fluorine, e. g., ammonium silicofluoride, ammonium borofluoride, into an aminotriazine-aldehyde resin.

The following examples in which the proportions are in parts by weight are given by way of illustration and not in limitation.

Example 1

| | Parts |
|---|---|
| Dry water-soluble melamine-formaldehyde resin | 100 |
| Ammonium silicofluoride | 0.6 |

These substances are blended together to form a homogeneous, stable, dry adhesive. The adhesive prepared according to this example may be mixed with water in a ratio of about 65 parts of the latter to about 100 parts of the resin adhesive. Such adhesive mixtures have a working life of 2 hours or more at about 70° F. and they harden in about 12–24 hours after application to wood surfaces to be joined.

Optionally the bonded materials may be placed in a kiln or oven at about 140° F. for several hours in order to obtain thoroughly cured products in a short time.

Plywood bonded with a resin mixture of the type disclosed has an extremely high shear strength not only when dry but after immersion in water at room temperatures for 48 hours and even after immersion in boiling water for 3 hours.

Example 2

| | Parts |
|---|---|
| Trimethylol melamine | 80 |
| Walnut shell flour | 17 |
| Tricalcium phosphate | 2 |
| Ammonium silicofluoride | 0.5 |

This mixture is blended so that all of the ingredients are amply mixed, thereby producing a resin having excellent properties similar to those mentioned above in connection with the products prepared according to Example 1.

Ammonium borofluoride may be substituted for the ammonium silicofluoride used in the above examples. Ammonium borofluoride is somewhat less active than ammonium silicofluoride and, accordingly, it is desirable for use in summer months when ordinary temperatures are higher than in other parts of the year.

My curing catalysts may be buffered by the addition of other substances, such as sodium formate, sodium acetate, disodium phosphate, sodium sulphite, etc.

My curing catalysts may be utilized in conjunction with any polymerizable aminotriazine-aldehyde condensation product. They are particularly suited for use in conjunction with the water-soluble aminotriazine-aldehyde resins especially for use as adhesives. The term "water-soluble aminotriazine-aldehyde resin" as used herein is intended to include those resins which form colloidal solutions or dispersions as well as true solutions. Any aldehyde condensation product of any aminotriazine may be employed. Among the aminotriazines, the following examples are mentioned: Melamine, monophenyl melamine, diphenyl melamine, triphenyl melamine, ammeline, thioammeline, ammelide, formoguanamine, acetoguanamine, lauroguanamine, stearoguanamine, etc. Other suitable aminotriazines are those mentioned in U. S. Pat. No. 2,197,357. Various mixtures of any of the aminotriazines may be used. Furthermore, mixtures containing aminotriazines such as those obtained by the thermodecomposition of dicyandiamide alone or in the presence of solvents, diluents or other reactive materials, such as aniline, may be employed. Any aldehyde may be used in accordance with my invention, including formaldehyde, polymers of formaldehyde, benzaldehyde, furfural, etc. Mixtures of aldehydes may also be utilized, for example, mixtures of formaldehyde and furfural.

In some instances, it may be desirable to modify the aminotriazine-aldehyde resins with other substances which are reactive with aldehydes to form resins, e. g., any urea, including urea itself, thiourea, dicyandiamide, aniline, phenol, resorcinol, the cresols, xylenols, etc. If this be done, the modifier should preferably form a minor proportion of the resin and in any event, the aminotriazine should be present in an amount of at least 5% based upon the weight of the other substance capable of forming resinous condensation products with aldehydes.

Suitable resins may be prepared in accordance with the disclosure of U. S. Pats Nos. 2,197,357 and 2,269,239, as well as in accordance with an application of Paul C. Schroy, Serial No. 356,655, filed Sept. 13, 1940.

For dry products such as adhesives, the initial aqueous condensation products may be dried in any desired manner by vacuum dehydration, by drum-drying, by tray-drying or by spray-drying. My adhesives should preferably contain at least 70% of resin, about 0–20% of walnut shell flour, any portion or all of which may be replaced by wood flour if desired and about 0.1–5% of curing catalyst such as ammonium silicofluoride or ammonium borofluoride. I have found that the products having specially desirable properties are produced by the use of about 0.6% of ammonium silicofluoride. In order to obtain a free-flowing, non-caking adhesive it is desirable to incorporate about 1–4% of some anti-caking agent such as tricalcium phosphate. Furthermore, gums, starches, dispersing agents or wetting agents may be included in my adhesive compositions if desirable.

My adhesive compositions are suitable for use in the manufacture of plywood and also for joining wooden surfaces generally. They may also be used as adhesives for joining a wide variety of surfaces including cellulosic sheets used in the manufacture of paper-board.

My adhesives have an additional advantage over conventional adhesives in that they are vermin-proof since the ammonium salts which I employ as catalysts have insecticidal and insect repellent properties.

The so-called glue line pH of my adhesive is above the minimum of 2.5 set by government specifications. On the other hand the glue line pH is sufficiently low to insure thorough cure of the resin adhesive.

While my curing catalysts are particularly adapted for use in adhesives and especially for use in cold-setting adhesives, nevertheless, they may also be used as catalysts in other resin compositions containing an aminotriazine-aldehyde resin. For example, they may be used in molding compositions comprising such resins, together with fillers, as well as for use in laminating syrups for the production of laminated paper or laminated cloth sheets. My catalysts are advantageously used without the application of high temperatures and pressures as in the production of laminated materials, but they may also be used in the high pressure and high temperature operations if desirable. Excellent core molds are easily obtained by the use of an aminotriazine-aldehyde binder such as a melamine-formaldehyde resin binder containing my catalysts.

Another application for my catalysts is in water paints containing urea-formaldehyde resins. These paints may have suitable fillers, dyes, pigments and extenders incorporated therein. My catalysts are also useful in coating or impregnating compositions for use in the treatment of textiles, paper, leather and other fibrous materials.

In any of the aforementioned applications of my catalysts, about 0.1–5% of the catalyst is employed based upon the resin content.

Obviously any modification and variations of compositions and processes described herein may be made without departing from the spirit and scope of the invention as defined in the appended claims.

I claim:

1. A hardenable aminotriazine-aldehyde condensation product intimately mixed with a curing catalyst which is selected from the group consisting of ammonium silicofluoride and ammonium borofluoride.

2. A water-soluble condensation product of an aminotriazine and an aldehyde intimately mixed with ammonium silicofluoride as a curing catalyst.

3. A water-soluble condensation product of an aminotriazine and an aldehyde intimately mixed with ammonium borofluoride as a curing catalyst.

4. An adhesive including a dry water-soluble melamine-formaldehyde resin containing about 0.1–5% of ammonium silicofluoride as a curing catalyst intimately mixed therewith.

RAYMOND R. HARRIS.